United States Patent
Knowler

(10) Patent No.: US 11,070,607 B2
(45) Date of Patent: Jul. 20, 2021

(54) DYNAMIC BEHAVIOR MODIFICATION FOR CONTENT DOWNLOAD AND PLAYBACK

(71) Applicant: DAZN LIMITED, Feltham (GB)

(72) Inventor: James E. Knowler, Croydon (GB)

(73) Assignee: DAZN LIMITED, Feltham (GB)

( * ) Notice: Subject to any disclaimer, the term of this patent is extended or adjusted under 35 U.S.C. 154(b) by 0 days.

(21) Appl. No.: 16/933,063

(22) Filed: Jul. 20, 2020

(65) Prior Publication Data
US 2021/0029190 A1  Jan. 28, 2021

Related U.S. Application Data

(60) Provisional application No. 62/877,012, filed on Jul. 22, 2019.

(51) Int. Cl.
| | |
|---|---|
| *G06F 15/16* | (2006.01) |
| *H04L 29/06* | (2006.01) |
| *H04L 12/26* | (2006.01) |
| *H04L 12/861* | (2013.01) |

(52) U.S. Cl.
CPC .......... *H04L 65/80* (2013.01); *H04L 43/0805* (2013.01); *H04L 49/90* (2013.01); *H04L 65/4023* (2013.01); *H04L 65/4092* (2013.01)

(58) Field of Classification Search
None
See application file for complete search history.

(56) References Cited

U.S. PATENT DOCUMENTS

| | | | |
|---|---|---|---|
| 9,712,860 B1* | 7/2017 | Waggoner | H04L 65/4084 |
| 10,708,331 B1* | 7/2020 | Joliveau | H04L 65/608 |
| 2014/0136653 A1* | 5/2014 | Luby | H04L 65/4015 709/217 |
| 2014/0215085 A1* | 7/2014 | Li | H04L 65/80 709/231 |

(Continued)

FOREIGN PATENT DOCUMENTS

| | | |
|---|---|---|
| EP | 2383999 A1 | 11/2011 |
| EP | 2993910 A1 | 3/2016 |
| WO | 134915 A1 | 1/2015 |

OTHER PUBLICATIONS

Bentaleb, Abdelhak et al., "Bandwidth Prediction in Low-Latency Chunked Streaming", 29th ACM SIGMMWorkshop on Network and Operating Systems Support for Digital Audio and Video (NOSSDAV'19), Amherst, MA, USA. ACM, New York, NY, USA,, Jun. 21, 2019, pp. 7-13.

(Continued)

*Primary Examiner* — Phyllis A Book
(74) *Attorney, Agent, or Firm* — Dorsey & Whitney, LLP

(57) ABSTRACT

The present disclosure relates generally to a method for dynamically selecting quality levels for content downloads. The method includes receiving by a media player a content download request; determining a state of a quality module, where the state depends at least in part on a bandwidth available to the media player and a buffer value for the content; providing to the media player from the quality module a quality value corresponding to the state, wherein the quality value is used by the media player to request one or more content fragments from a server; receiving by the media player the one or more content fragments; and displaying by the medial player the one or more content fragments.

13 Claims, 5 Drawing Sheets

(56) References Cited

U.S. PATENT DOCUMENTS

| | | | |
|---|---|---|---|
| 2014/0282792 A1 | 9/2014 | Bao et al. | |
| 2015/0095509 A1* | 4/2015 | Huang | H04L 65/604 709/231 |
| 2015/0215359 A1 | 7/2015 | Bao et al. | |
| 2015/0381690 A1* | 12/2015 | Schmidt | H04L 65/607 709/231 |
| 2016/0134915 A1 | 5/2016 | Oran | |
| 2017/0250882 A1* | 8/2017 | Kellicker | H04L 67/16 |
| 2018/0027039 A1* | 1/2018 | Moorthy | H04N 21/2401 709/219 |
| 2018/0248926 A1* | 8/2018 | Binns | H04L 65/4084 |

OTHER PUBLICATIONS

International Search Report and Written Opinion of International Patent Application No. PCT/EP2020/070703, dated Oct. 1, 2020, 17 pages.

* cited by examiner

DYNAMIC BEHAVIOR MODIFICATION FOR CONTENT DOWNLOAD AND PLAYBACK

CROSS REFERENCE TO RELATED APPLICATIONS

This application claims priority to U.S. provisional application No. 62/877,012 entitled "Dynamic Behavior Modification for Content Download and Playback," filed on 22 Jul. 2019, which is incorporated by reference herein for all purposes.

FIELD

The present disclosure relates generally to content streaming onto computing devices.

BACKGROUND

Many consumers receive content and other media from sources other than conventional over the air radio waves and cable providers. In particular, much of the content available over the Internet is "streamed" to user devices from one or more content servers, such as a server in a content delivery network (CDN). With content streaming, the content file is divided into fragments or packets and then transmitted to the user device over a network. As bandwidth or network issues arise, either on the client side or server side, fragments can stall out, fail, or the like, causing omissions in the content and/or failure of the content to display completely.

Additionally, many content streaming solutions are based on preloaded or saved content, e.g., movies or playback of video clips or the like. In these instances, the video or media player for the content may include large buffering times to decrease visible content delivery issues, i.e., the downloading issues are hidden from the user. However, large buffering times are inapposite to live streamed content, such as sporting events, award shows, live performances, and the like, since with this type of content large buffering times or windows will cause a significant delay between the live events and the user experiencing the content. The present disclosure is directed to methods that help to prevent content delivery issues.

SUMMARY

In one embodiment, a method for displaying content on a user device is disclosed. The method includes receiving by a media player a content request corresponding to a fragment download from a server, receiving from a quality module in communication with the media player, a quality selection for the fragment, downloading by the media player the fragment from the server, analyzing a bandwidth availability for the media player during download of the fragment, and based in part on the bandwidth availability, stopping or continuing to download the fragment.

In one example, the method includes analyzing a buffer level during download of the fragment, where stopping or continuing to download the fragment is based in part on the buffer level and the bandwidth availability. The method may also that the quality module utilizes the buffer level and the bandwidth availability to provide an updated quality selection.

Methods may include after stopping the download of the fragment, receiving a lower quality selection for the fragment and downloaded by the media player the fragment at the lower quality selection.

Methods may include a server that is a content delivery network server or a plurality of content delivery network servers.

In some examples, method may include analyzing the bandwidth availability by determining a first bandwidth estimate, determining a second bandwidth estimate where the first bandwidth estimate and the second bandwidth estimate are different from one another, and analyzing the first bandwidth estimate and the second bandwidth estimate together to output the bandwidth availability.

The bandwidth availability may be analyzed based on a local network condition of a local network in communication with the user device.

Methods may also include analyzing bandwidth availability by generating a first estimate reflective of a local network condition of a local network for the user device based on a size of the fragment relative to a download time of the received fragment to the user device from the server, generating a second estimate reflective of a server condition and the local network condition based on a number of bytes for the fragment received over an interval, and selecting the first estimate, the second estimate, or a combination of the first estimate and the second estimate to determine the bandwidth availability. The methods may include selecting the first estimate, the second estimate, or a combination of the first estimate and the second estimate by determining whether the first estimate is accurate, determining whether the second estimate is accurate, when the first estimate is accurate and the second estimate is not accurate, selecting the first estimate for the bandwidth availability, when the first estimate is not accurate and the second estimate is accurate, selecting the second estimate for the bandwidth availability, and when the first estimate and the second estimate are both accurate, statistically combining the first estimate and the second estimate to determine the bandwidth availability. In some methods, the first estimate and the second estimate are determined at different points in time.

In another embodiment, a method for dynamically selecting quality levels for content downloads is disclosed. The method includes receiving by a media player a content download request, determining a state of a quality module, where the state depends at least in part on a bandwidth availability to the media player and a buffer value for the content, providing to the media player from the quality module a quality value corresponding to the state, where the quality value is used by the media payer to request one or more content fragments from the server, receiving by the media player the one or more content fragments, and displaying by the media player the one or more content fragments.

In some methods, the quality module may include at least three states. Examples of the three states include an initializing state corresponding to a first quality level, a normal state corresponding to a second quality level, and a low state corresponding to a third quality level. In some methods, the initializing state may correspond to a first timeout value, the normal state may correspond to a second timeout value, and the low state may correspond to a third timeout value.

In some methods, the quality module is separate from the media player.

In some methods, the bandwidth availability is determined by at least one of a local network condition and/or a server network condition.

In yet another embodiment, a method for estimating bandwidth for content downloads to a user device is disclosed. The method includes receiving a first fragment download from a server, determining a network bandwidth type estimate by determining a byte number of the first fragment received over a first predetermined interval of time to determine a first bandwidth estimate, determining another network bandwidth type estimate by determining a byte number of the first fragment received over a second predetermined interval of time to determine a second bandwidth estimate, determining a local bandwidth type estimate by dividing a byte size of the first fragment download by a download time for the first fragment download to output a third bandwidth estimate, and selectively combining the first bandwidth estimate, the second bandwidth estimate, and the third bandwidth estimate to output a bandwidth value. The method may also include utilizing the bandwidth value to select a quality level for a second fragment to download from the server.

In some methods the third bandwidth estimate is disregarded when the first fragment is smaller than a size threshold. In some methods, the third estimate is disregarded when the first fragment did not complete download during the interval of time.

In some examples, a non-tangible computer readable medium that includes instructions when executed by a processor is disclosed. The instructions cause the processor to receive a first fragment download from a server, determine a network bandwidth type estimate by a determining a byte number of the first fragment received over a first predetermined interval of time to determine a first bandwidth estimate, determine another network bandwidth estimate type estimate by determining a byte number of the first fragment received over a second predetermined interval of time to determine a second bandwidth estimate, determine a local bandwidth type estimate by dividing a byte size of the first fragment download by a download time for the first fragment download to output a third bandwidth estimate, selectively combine the first bandwidth estimate, the second bandwidth estimate, and the third bandwidth estimate to output a bandwidth value, and utilize the bandwidth value to select a quality type for a second fragment to download from the server.

DETAILED DESCRIPTION

Figure 1:
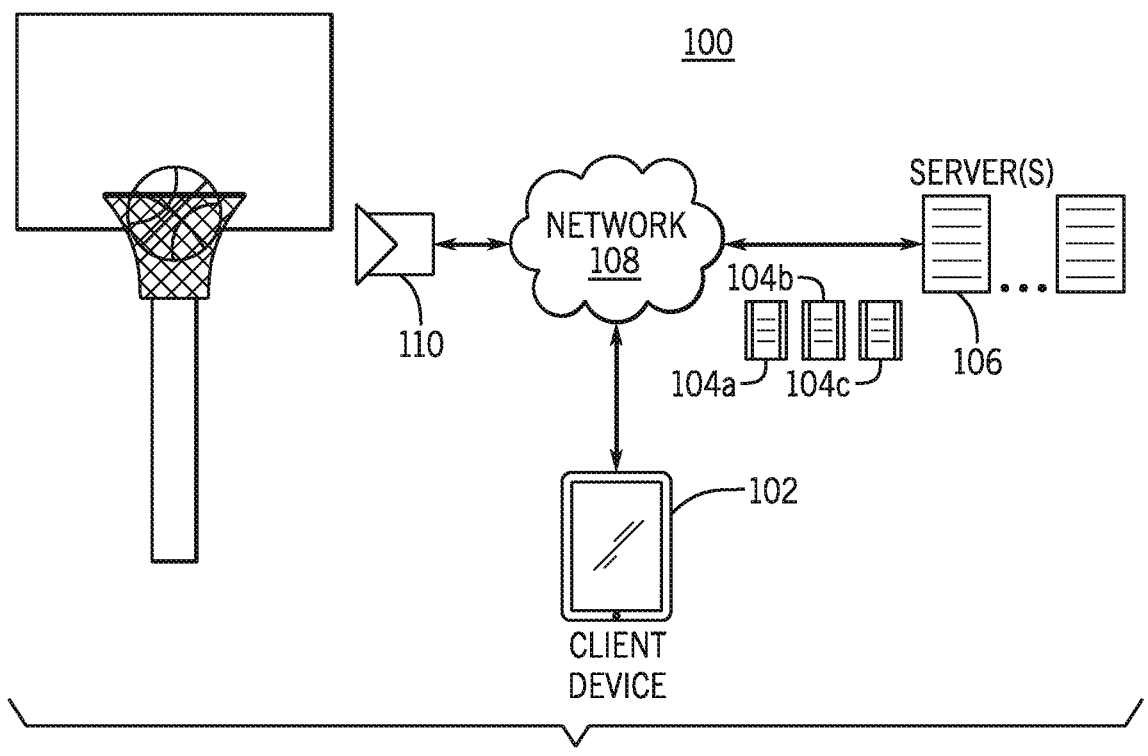
FIG. 1 illustrates a system diagram of a system for content delivery including an adaptive quality module.

The present disclosure relates generally to a system to reduce content delivery and display issues related to streamed content, such as video and other media. In one embodiment, a system that dynamically modifies the quality level of content fragments requested from a server, while reducing buffering times, is disclosed. The system includes an adaptive module that interfaces with a content player (e.g., media or video player) module on a user device. The adaptive module acts to dynamically adjust the bitrate or quality of the content received on the user device based on a determined bandwidth availability, while simultaneously reducing the buffering windows and time frames for downloads required. The adaptive module helps to reduce glass-to-glass latency for live content streams by reducing the playback buffers required, while also increasing the definition or quality of the streamed content to the maximum supported by the bandwidth of the client or user device.

The adaptive module may include a bandwidth estimator that utilizes different estimation assessments to output a bandwidth estimation that is more accurate as compared to conventional single type estimators. The bandwidth estimator generates a first estimate generally reflective of local network conditions, such as an estimate based on the size of the received fragment relative to the download time for the fragment. The bandwidth estimator also generates a second estimate generally reflective of network and local network conditions that is determined at selected intervals based on the number of bytes or other data packets received over the duration of the interval. In instances where the first estimate is determined to be inaccurate, such as when a size of the received fragments is below a particular threshold, the bandwidth estimator relies on the second estimate. For example, the first estimate may be discarded. Similarly, in instances where the second estimate may be considered to be inaccurate, such as when no fragments were actually downloaded during the selected interval, the bandwidth estimator relies on the first estimate. In instances where both the first and second estimates are determined to be generally accurate or otherwise acceptable, the bandwidth estimators applies a statistical analysis or other algorithm, such as a rolling average, to output a current bandwidth estimate for the user device. The bandwidth estimate can then be used to adjust the quality selection for content fragments.

The adaptive module may also include a quality module that dynamically varies the suggested content fragment quality to be requested from the content server, as well as the timeout durations for fragments. The quality module may act as a state machine depending on the state of the streamed content as stored in memory, e.g., buffer thresholds.

In one example, the quality module includes three states, an initializing state, a normal state, and a low state, with each state corresponding to a particular fragment quality level or quality instruction (e.g., increase quality, decrease quality, remain the same). Transitions between the states may be smoothed or otherwise on a gradient, reducing visual artifacts or other identifiable changes by the user in the quality level of the content. As one example, the first state, such as a rebuffer or initializing state, may be the initial state of the quality module and may output a particular fragment level value, such as a medium quality, which allows the memory to quickly build up a buffer. A second or middle state, such as a steady state or normal state, may be entered from the rebuffer state when the buffer has reached a particular threshold. The steady state may correspond to a high quality fragment value selection, such as the highest quality fragments available. The third or low state, such as a panic state, may be entered when the buffer is below a select threshold, such as a very low or empty threshold. The panic mode or panic state corresponds to the lowest quality of fragments, to allow the buffer to fill as quickly as possible. From the panic state, the quality module may transition again to the rebuffer state.

A request monitor module requests fragments and other corresponding data, such as manifests, from the server on behalf of the content player. The request monitor module also tracks active requests from the server and tracks and controls fragment downloads, e.g., can timeout or cancel fragment downloads. In this manner, the request monitor module, which may interface between the player and the server, takes responsibility for hypertext transfer protocol (HTTP) request handling. The request monitor module interfaces with the quality module to determine timeout durations for fragment downloads, optionally for both timeout duration to receive a first byte and/or timeout duration for the request to complete successfully.

The adaptive module may also include a managing module that interfaces with the content player and the quality module to manage fragment download requests and provide instructions on playback. The managing module may poll or otherwise communicate with the quality module at intervals in order to receive information regarding the current quality level selected for download, as well as receive timeout durations, canceling or timing out all current active requests, selecting the fragment quality, and switching between quality states. The managing module communicates the selected quality level to the player, such that the player can use the quality level when downloading the next fragment.

Turning to the figures, FIG. 1 illustrates a system 100 for dynamically varying content playback behavior and quality. The system 100 may include one or more client devices 102, one or more servers 106, one or more content sources 110, all of which may be in communication via a network 108. The client device 102 may include one or more computing devices or display devices, such as, but not limited to, television, smartphone, gaming or content console, tablet, laptop, and the like. Generally the client device 102 will include a display and an onboard content player, such as a media or video player (e.g., Shaka player, ExoPlayer, AVPlayer, and the like), that receives and converts content data into visual images to be displayed to the user. The type of client device and content player may be varied as desired and the system 100 may generally support multiple client devices accessing the same content.

The servers 106 host content that is transmitted to the client device 102 via the network 108, that may be received from the content sources 110, other servers, or the like. The servers 106 may be distributed, virtual machines, or standalone devices. In some embodiments, the servers 106 may be one more nodes of a content distribution network (CDN), and include one or more proxy servers and corresponding data centers. The servers 106 are configured to send data representative of the content to the client device 102.

In the example of video content, the servers 106 may optionally encode and transmit a media file into multiple fragments and an index file, as well as two or more quality versions of the fragments. For example, for a first fragment representing 10 frames of content, the server 106 may prepare a low quality version of the first fragment, a medium quality version of the first fragment, and a high quality version of the first fragment. The different qualities are different bitrates corresponding to higher or lower resolution, as an example. Additionally, depending on the type of content, the files corresponding to the content may include video fragments and audio fragments. A manifest file including metadata corresponding to the types of bitrates available (e.g., types of fragments, low, medium, high) and location on the server. It should be noted that certain content files may include multiple manifest files. For example, with live playback for content, the manifest will be dynamically generated and need to be updated as the playback continues. With reference to FIG. 1, the server 106 may store content files, such as a first fragment file type 104a, a second fragment file type 104b, and a third fragment file type 104c, where the content represented is the same, but the bitrate between the three is different, corresponding to low, medium, and high resolutions, respectively.

The network 108 is substantially any type of data transmission platform, such as a wireless or wired communication system. In many embodiments, the network 108 is a combination of one or more networks, such as local area networks, wide area networks, and the like, e.g., the Internet.

The content sources 110 may be cameras or other capture devices that may be used to transmit content to the severs 106, such as instances of live events, where the content may not be already stored on the server 106. For example, as shown in FIG. 1, the content source 110 is a camera capturing a live action event, such as a sporting event, a live play, awards show, news, or other action as it occurs. The content source 110, which in this case is a camera including image sensors, records the event, and in real time transmits the data corresponding to the captured event (e.g., live content) to the servers 106 via the network 108. At the severs 106 or at the content source 110, the content 104 is encoded into the multiple resolutions and bitrates.

Figure 2:
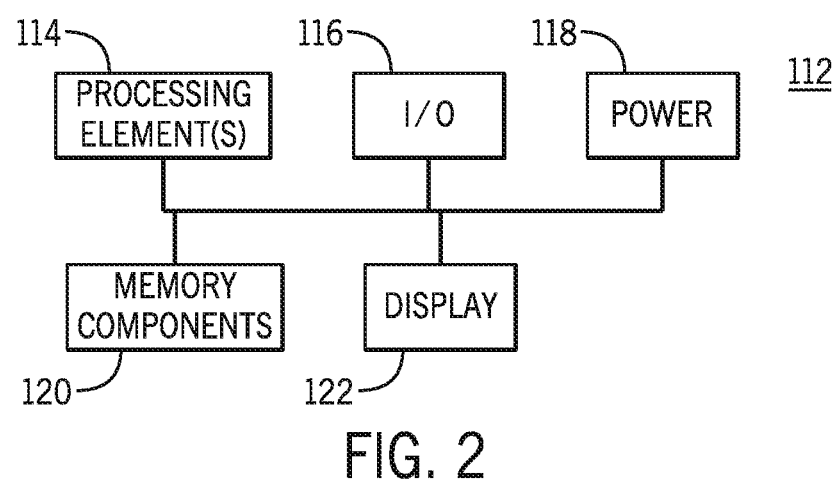
FIG. 2 illustrates a simplified block diagram of various computing devices of the system of FIG. 1.

FIG. 2 illustrates a simplified block diagram of a computing device, such as the client device 102, the servers 106, and/or content sources 110. The computing devices may include one or more of one or more processing elements 114, an input/output interface 116, a power source 118, one or more memory components 120, and optionally a display 122, each of which may be in communication with one another such as through one or more system buses, wireless means, traces, or the like.

The one or more processing elements 114 are electronic devices capable of processing, receiving, and/or transmitting instructions and data. The processing elements 114 may be a microprocessor, processor, microcomputer, graphical processing unit, or a combination of multiple processing elements. For example, a first processing element may control a first set of components of the computing device and the second processing element may control a second set of computing devices, where the first and second processing elements may or may not be in communication with one another. Additionally the processing elements may be configured to execute one or more instructions in parallel.

The input/output interface 116 receives and transmits data to and from the network 108. The input/output interface 116 may transmit and send data to the network 108, as well as other computing devices. The input/output interface 116 may be configured to send and receive HTTP requests.

The power source 118 provides power to various components of the computing device. The power source 118 may include one or more rechargeable, disposable, or hardwire sources, e.g., batteries, power cords, or the like.

The memory 120 stores electronic data, such as the content 104a, 104b, 104c, that may be utilized by the computing devices. The memory 120 may include electrical data or content, such as processor instructions (software code), audio files, video files, document files, and the like. The memory 120 may include multiple components, such as, but not limited to, non-volatile storage, a magnetic storage medium, optical storage medium, magneto-optical storage medium, read only memory, random access memory, erasable programmable memory, flash memory, or a combination of one or more types of memory components. In many embodiments, the server 106 may have a larger memory capacity than the client or user devices 102 *a*-102 *n*. The memory 120 may be non-tangible and configured to store instructions that may be executed by one or more processors or processing devices.

In some instances, the computing devices, such as the client device 102, may include a display 122. The display 112 provides a visual output for the computing devices and may be varied as needed based on the device. The display 112 may include a liquid crystal display screen, light emitting diode screen, plasma screen, and the like.

Figure 3:
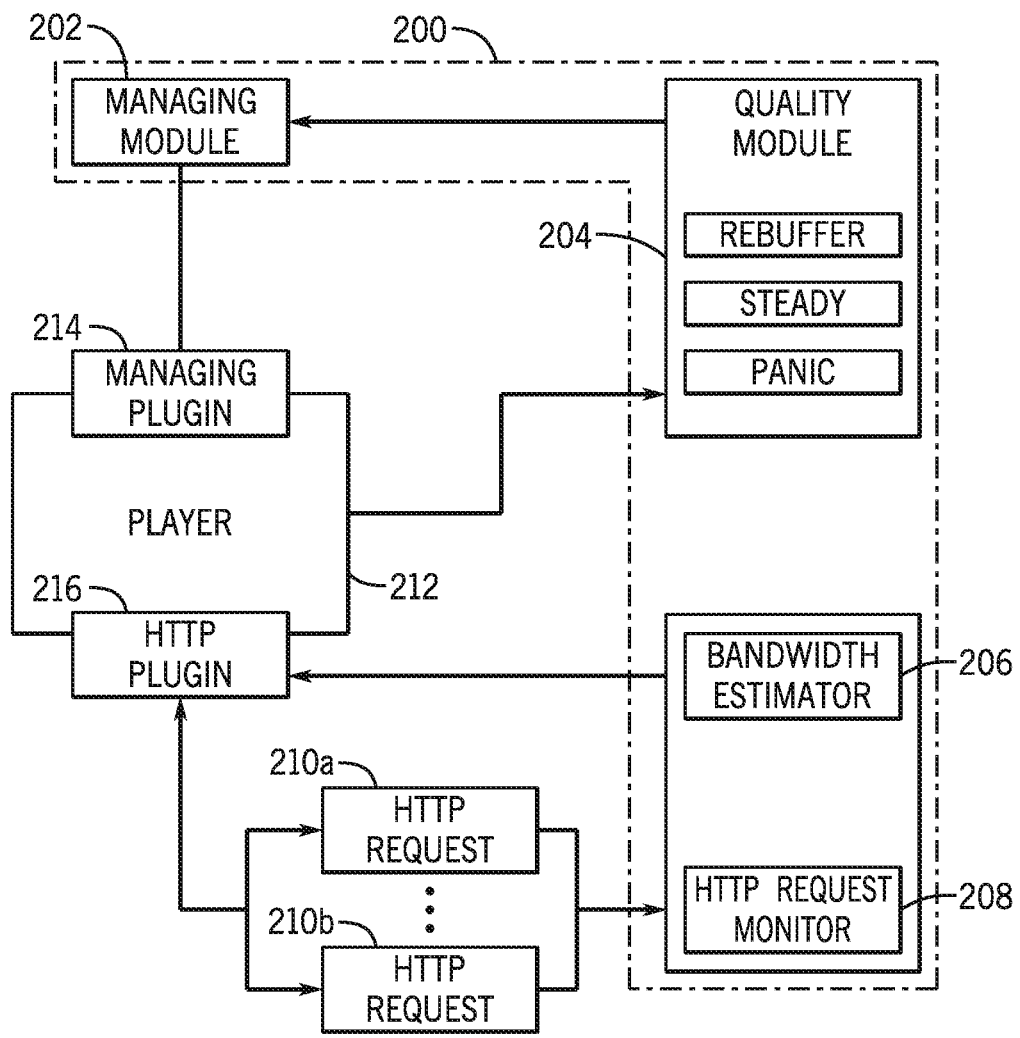
FIG. 3 illustrates an example of an architecture for an adaptive quality module for use with a content player on a user device.

FIG. 3 illustrates a block diagram of an illustrative architecture for an adaptive module 200 on a client device 102 for requesting and dynamically updating content bitrate based on bandwidth. As shown in FIG. 3, the adaptive module 200 may be configured to interface with a content player 212, such as a native, onboard, or other installed player on the client device 102. The content player 212 may be an adaptive bitrate (ABR) player that allows the player to automatically adjust and display different file resolutions. For example, the adaptive module 200 may include one or more application program interfaces (APIs) or plugins that are able to transmit and receive data and instructions from the player 212.

The adaptive module 200 may include a managing module 202, a quality module 204, a bandwidth estimator module 206, and a request monitor 208, which are in communication with one another, to define a heuristic model that modifies the behavior of the content player 212, while allowing the content player 212 to still control certain aspects of content retrieval and playback. For example, in some implementations, the content player 212 remains in control of playback pipeline (play, pause, seek) and determines when to download content fragments 104*a*, 104*b*, 104*c*.

The managing module 202 provides inputs to the content player 212 regarding the quality of fragments to be downloaded, which the content player 212 uses to decide when to download the next fragment. In one embodiment, the managing module 202 provides fragment quality information to the content player 212 via a plugin 214 or other communication layer or mechanism. The managing module 202 is also in communication with the quality module 204, which delivers the determined quality level to the manager 202 based on current buffer levels and bandwidth estimation. The quality levels can be communicated to the managing module 202 via a push or pull configuration.

The quality module 204 provides outputs to the managing module 202 regarding the fragment quality level that the content player 212 should request from the server 106, as well as action items for in progress downloads (e.g., cancel, timeout, etc.). The quality module 204 may also receive metrics or data from the content player 212, that it can use to make decisions, such as buffer levels, playback progress, etc. The quality module 204 may be implemented as a state machine (see, e.g. FIGS. 6A and 6B), such that depending on the state of the module, different fragment qualities are selected. The state of the module 204 depends on the bandwidth of the client device 102, as well as the state of the content 104 stored on the memory components 120 or buffer values. In other words, the transition between states may depend on both the current downloading performance and past history of downloads. In some embodiments, the quality module 204 may be have three modes corresponding to three different quality selections, e.g., low quality, medium quality, and high quality. In other embodiments, the quality module 204 may include fewer or more modes, such as high/low, or the like, depending on the available qualities for download for a particular content item.

The bandwidth estimator 206 dynamically determines the available bandwidth or performance of the client device 102 as it receives fragments, such as content fragments 104 from the server 106. In some embodiments, the bandwidth estimator tracks bitrate and bandwidth in bits per second, but other units can be used as well. The bandwidth estimator 206 may be configured to weight different bandwidth estimates in order to determine more accurate assessments of bandwidth. For example, the bandwidth estimator 206 may use a first algorithm and a second algorithm to determine bandwidth separately from one another and select one of the first or second values output or use a combination of the first and second values, based on download characteristics. This selective weighting allows the bandwidth estimator 206 to provide more accurate bandwidth determinations than previous content streaming players, allowing for more accurate fragment selections that will timely download.

In one embodiment, the first algorithm determines a first bandwidth value based on fragment size divided by the download time for that fragment, the second algorithm determines a second bandwidth value based on a number of bytes received during a time interval, where the first value is weighted for larger fragment calculations, the second value is weighted for intervals when at least one fragment was downloaded during the time, and a combination, such as a rolling average, of the two values is used when requirements for both values are met, i.e., a large fragment that downloaded over an interval.

The request monitor 208 tracks download requests and status from the content player 212 regarding content fragments, etc. As one example, the request monitor 208 may track download time for video fragments, audio fragments, manifest fragments. The request monitor 208 may also receive instructions to timeout fragments that take too long to download, such as those that take too long to receive the first byte of data and/or are taking too long to complete. In these instances, the request monitor 208 may receive instructions from the quality module 204 regarding timeout values and thresholds. The request monitor 208 may also provide APIs that allow the managing module 202 via the quality module 204 to set time out durations for both first byte receipt and completion, and time out all active requests. In instances where the content player 212 may use HTTP requests, the monitor 208 interfaces with the player 212 via a plugin 216 that allows the monitor to both track and control various HTTP requests 210*a*, 210*b*. The HTTP requests 210*a*, 210*b* may correspond to fragment download requests from the server 106, such as for an audio fragment, video fragment, index file, and/or manifest.

Figure 4:
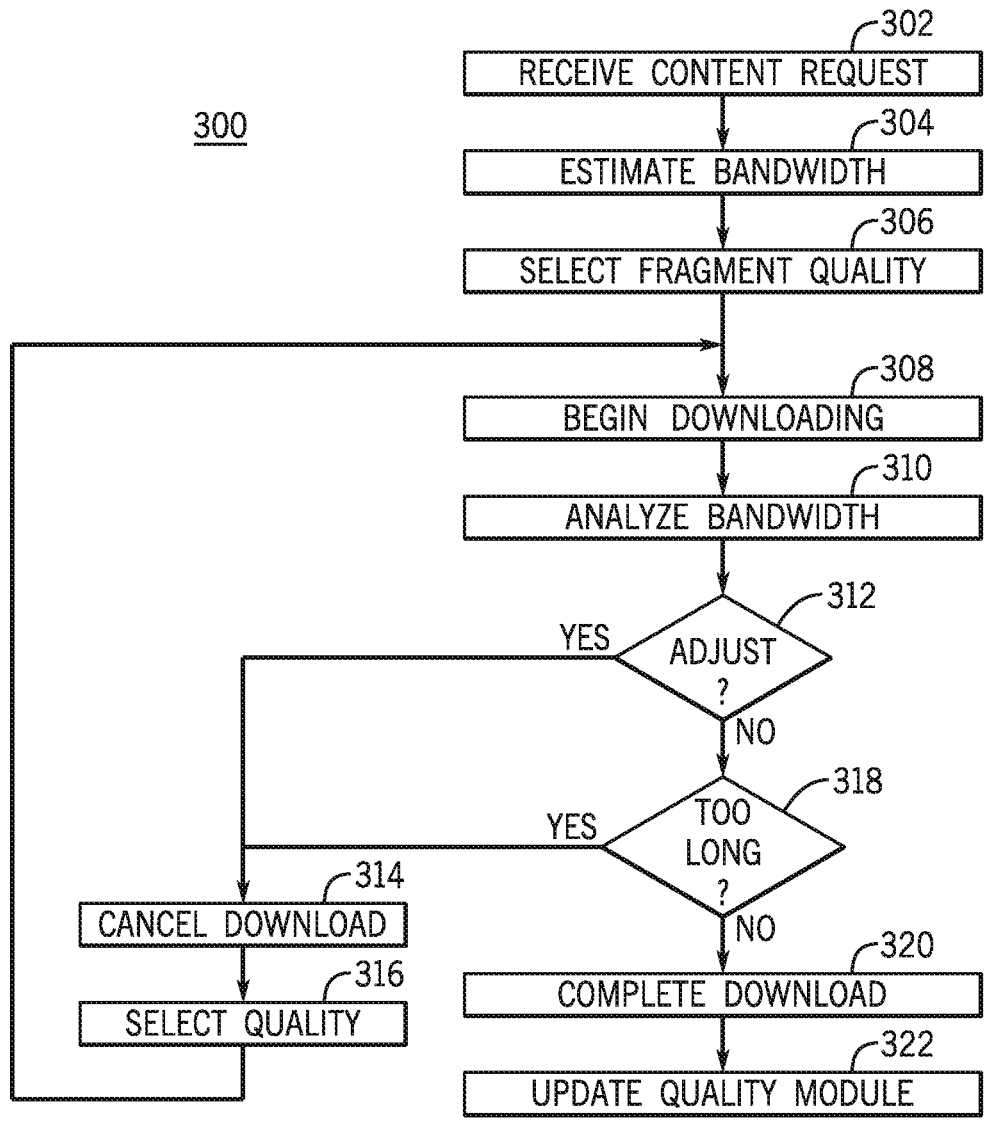
FIG. 4 is a flow chart of a method for utilizing the adaptive quality module to request and download content to a user device.

A method of using the adaptive module 200 for streaming and managing fragment quality is shown in FIG. 4. With reference to FIG. 4, the method 300 may begin with operation 302 and the player 212 receives a content request, such as by a user selecting a video to view on the client device 102, or when the content player 212 is ready to download another fragment of an in-progress video. The method 300 then proceeds to operation 304 and the bandwidth for the client is estimated using the bandwidth estimator 206. The bandwidth estimator 206 determines the current local bandwidth available to the content player 212, see method 300 in FIG. 4, as an example of the bandwidth estimation.

Using the estimated bandwidth, the method 300 proceeds to operation 306 and a fragment quality is selected. For example, the player 212 may receive a quality download instruction from the managing module, which may receive it from the quality module 204, where the quality is based on a current state of the module 204, which may be dependent on both the bandwidth available and current buffer values, e.g., amount of content stored in buffer. The quality module 204 provides an output fragment quality value to the player 212, which then uses the quality value to select a particular fragment for download from the server 106. In other words, the client device 102, via the content player 212 or directly from the adaptive module 200, requests a particular fragment from the server 106, where the fragment quality is selected by the quality module 204.

The method 300 then proceeds to operation 308 and the client device 102 begins downloading the fragment at the selected quality. While the fragment is downloading, the method 300 proceeds to operation 310 and the bandwidth estimator 206 analyzes the bandwidth. The bandwidth analysis may be similar to the operation 304 performed before the fragment was downloaded and notably can be done both before and while the fragment is downloading. This dynamic and on-going assessment allows the adaptive module 200 to identify bandwidth restrictions and other capacity issues more quickly than conventional ABR players, which typically will not check bandwidth while downloads are in progress.

Using the bandwidth estimated in operation 310, the adaptive module 200 determines whether to adjust the current download. For example, the request monitor 208 may determine that the current in-progress fragment downloads should be adjusted in light of a change in bandwidth, e.g., the fragment qualities are too high for the current bandwidth levels. As another example, the quality module 204 may enter a low quality mode, such as a panic model, which may provide instructions to cancel in-progress downloads.

If the download quality is to be adjusted, the method 300 proceeds to operation 314 and the request monitor module 208 cancels the current fragment download. Depending on the integration of the adaptive module 200, the content player 212 may view the cancellation of the fragment downloads as a timeout request or other error from the server side, rather than a cancellation action executed locally. This type of seamless integration, allows the content player 212 to operate with the adaptive module 200, without specialized integration between the two components.

After the download is canceled, the method 300 proceeds to operation 316 and a new quality is selected. In one example, the new quality is a lower quality level from the canceled fragment. The quality level input may be provided by the quality module 204, similar to operation 306 and may be dependent both on the state of the client device 102 bandwidth, but also the buffer, and may be determined based on the state of the quality module 204. With the quality level selected, the method 300 returns to operation 308 and the content player 212 requests a selected fragment based on the input quality from the server 106 and the downloading begins.

With reference again to FIG. 4, if in operation 312, the downloads do not need to be adjusted based on bandwidth, the method 300 may proceed to operation 318 and the request monitor 208 may determine whether the current download is taking too long. For example, the quality module 204 may provide timeout thresholds for different quality levels and the request module 208 may monitor current progress to determine if the download time for a fragment exceeds the current threshold value. If the fragment download time exceeds the current download threshold value, the method 300 proceeds to operation 314 and the fragment download is canceled by the request monitor module 208.

Alternatively, if the download is proceeding as desired or otherwise downloading within the allotted time interval, the method 300 proceeds to operation 320 and the download is completed by the content player 212. Once the fragment download is completed, the content player 212 may provide an update in the form of data to the quality module 204. For example, the content player 212 may provide a buffer status update (e.g., amount of content in memory 120) to the quality module 204, as well as other output data that may be utilized by the quality module 204 to determine quality levels for download and adjust states if needed.

It should be noted that after providing data to the quality module 204, the method 300 will often return to operation 302, as the player 212 may be ready to request a new fragment or content item from the server 106. As such, the method 300 may repeat for the length of the content being accessed or as new content is requested by the user.

Figure 5:
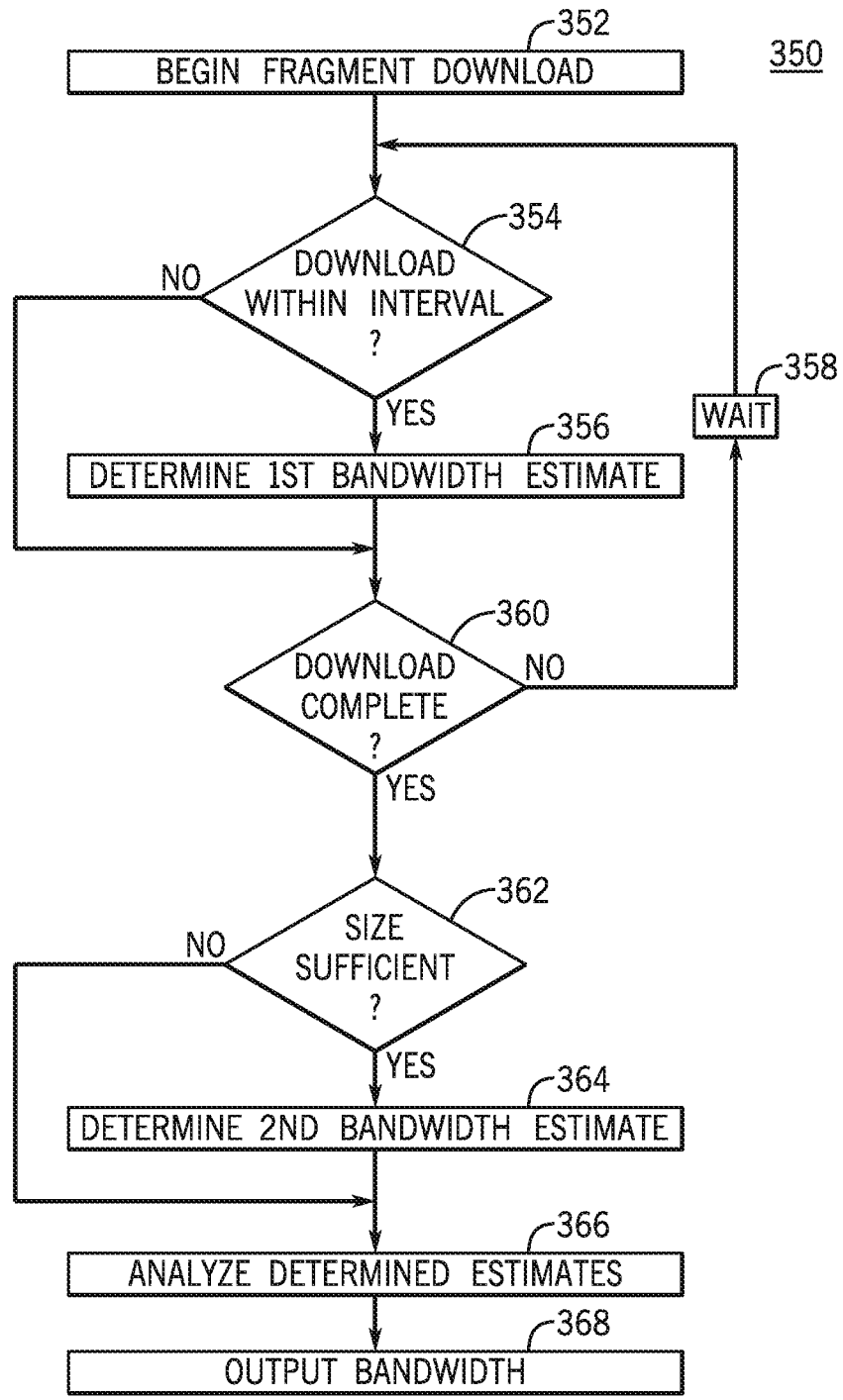
FIG. 5 is a flow chart illustrating a method for estimating bandwidth for a user device.

In operations 304, 310 of method 300, the adaptive module 200 may utilize a bandwidth estimate or analysis in order to determine actions with respect to fragment downloads. These operations 304, 310 may be performed by the bandwidth estimator module 206 using an estimation method 350 similar to the one shown in FIG. 5. With respect to FIG. 5, the estimation method 350 may begin with operation 352 and the bandwidth estimator module 206 begins a fragment download. As the fragment is downloading, the method 350 may proceed to operation 354 to determine whether the fragment has been downloading throughout a predetermined interval. For example, in some embodiments, the bandwidth estimator module 206 may use a first type of analysis for fragments that are downloading within a predetermined interview, e.g., a window of 200 to 1,2000 milliseconds and in one embodiment around 500 milliseconds.

If at least one fragment was downloading during the interval in operation 354, the method 350 proceeds to operation 356 and the bandwidth estimator module 206 determines a first bandwidth estimate using both the interval and fragment characteristics. In one example, the bandwidth estimator module 206 may count the number of bytes received during the time interval and divide the number of bytes by the duration of the time interval, e.g., if 100 bytes were received over a 2 second interval, the first bandwidth estimated value may be 50. This first bandwidth analysis may generally reflect network conditions and include improved accuracy over the first estimate analysis that may reflect errors due to concurrent requests for small and large fragments. As such, in some instances, the first type of bandwidth assessment may be considered a network analysis.

If in operation 354 a fragment was not downloading throughout the entire interval or once the first bandwidth estimate has been determined in operation 356, the method 350 proceeds to operation 360. In operation 360, the bandwidth module analyzes whether the download is complete. If the fragment has not yet completed, the method 350 proceeds optionally to operation 358, where the bandwidth estimator module 206 waits for a short period of time, such as for the remaining interval time or next interval time of the first bandwidth estimate, before returning to operation 354. The wait operation 358 may be executed to allow additional bytes to be download over a selected time interval. The time interval may be predetermined by the bandwidth estimator module 206 and correspond to an estimating interval used to track the number of bytes received in a particular time frame. The interval may vary depending on the client device 102, current bandwidth, and integration of the adaptive module 200 with respect to the content player 212. It should be noted that there may be multiple first bandwidth estimated values for a particular fragment, as long as the fragment is longer than the selected estimate interval length and is continuously downloading through two or more intervals.

With reference again to FIG. 5, if in operation 360 the fragment download has completed, the method 350 proceeds to operation 362 and the module determines whether the fragment size is a sufficient size. In this example, the second type of analysis may be a local or simple analysis that estimates bandwidth locally with respect to the client device 102, and may not capture server related issues, e.g., response delays. To that end, the estimator module 206 may set minimum fragment size (e.g., number of bytes) to allow more accurate assessments.

If the completed downloaded fragment size is sufficient, e.g., exceeds a particular threshold in terms of number of bytes or other data unit, the method 350 then proceeds to operation 364 and the bandwidth estimator module 206 determines a second type of bandwidth estimate value. In one embodiment, the second bandwidth estimate may be a local estimate and may be an assessment of the number of bytes of the fragment received divided by the length of time to download the bytes. The resulting value is then considered to be a second type of bandwidth estimate, such as a local estimate or the like. In some examples, it should be noted that the second bandwidth estimate may be determined at a second point in time from the first bandwidth estimate.

Once the second bandwidth estimate value has been determined in operation 364, or after operation 362 when the size was insufficient, the method 350 proceeds to operation 366. In operation 366 the bandwidth estimator module 206 analyzes the available estimates, e.g., first estimate value and second estimate value, to determine a bandwidth estimate. For example, a third estimate value, based on the insufficiently sized fragment may be discarded, disregarded, and/or not calculated.

In one example, the first estimate and the second estimate are combined via a rolling average analysis, e.g., the last three chronological values, are combined together. In one example, as a fragment begins downloading, the fragment is not completed, so during download, there will be two first type estimate values (determined at two different time intervals), determined during download. After the fragment has downloaded, a second type value may be available. In this example, the bandwidth estimator module 206 may average the two first type estimates and the one second type estimate to output a combined bandwidth estimate. As a specific example, the second estimate value may require a completed download of minimum of 35,000 bytes and the first estimate value may require a minimum download time of 50 milliseconds, with a bandwidth estimate interval of 500 milliseconds.

As another example, the bandwidth estimator module 206 may weigh the first and second type values differently when combining them together. For example, in instances where the first type values are network estimates, the estimator module 206 may weight these values higher when the buffer for the content player 212 is fuller, whereas the beginning of rebuffering the second type values when corresponding to a local bandwidth assessment may be weighted higher. In some instances the buffer may be analyzed in seconds of playback stored in memory 120, but other measurements may be used as well.

By analyzing bandwidth using different types of assessments that update based on the download characteristics, the bandwidth estimator module 206 can more accurately detect available current bandwidth for downloading fragment packets. Also the dynamic assessment allows the bandwidth estimator to more quickly identify bandwidth issues not identified by conventional ABR players. For example, conventional ABR players may estimate bandwidth changes within 20 to 30 seconds, whereas the hybrid method of the bandwidth module can detect changes within 1 to 2 seconds. This fast response time is particularly useful with live streamed content, where the player is unlikely to have a large buffer of content and needs to be able to quickly adapt to ensure that there are no breaks in the video stream as viewed by the user. Additionally, the module may be selected to continue to track bandwidth capacity, even while downloading fragments, which is not possible with conventional ABR players and conventional heuristics.

Figure 6A:
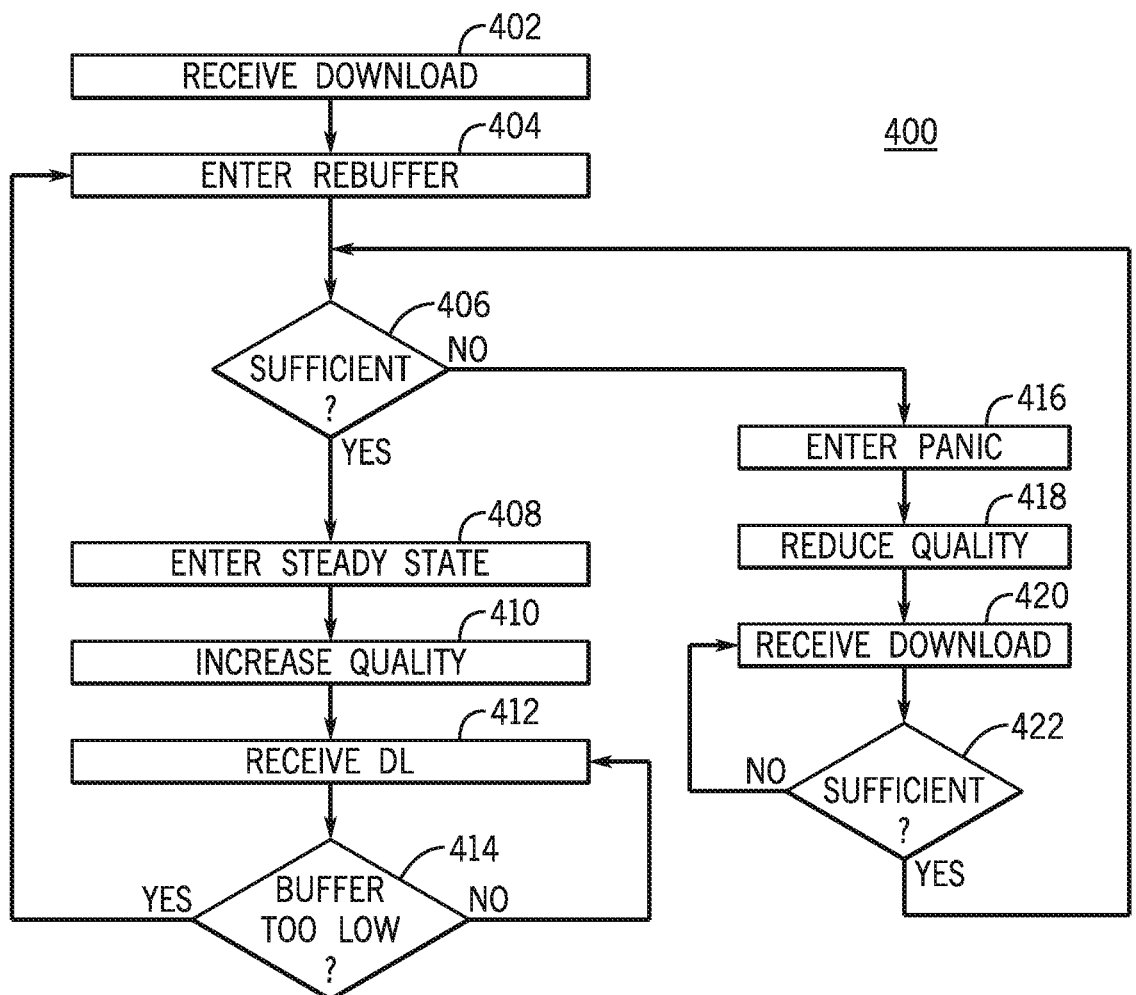
FIG. 6A is a flow chart illustrating a method for transitioning a quality module between different states based on bandwidth and/or buffer size.
Figure 6B:
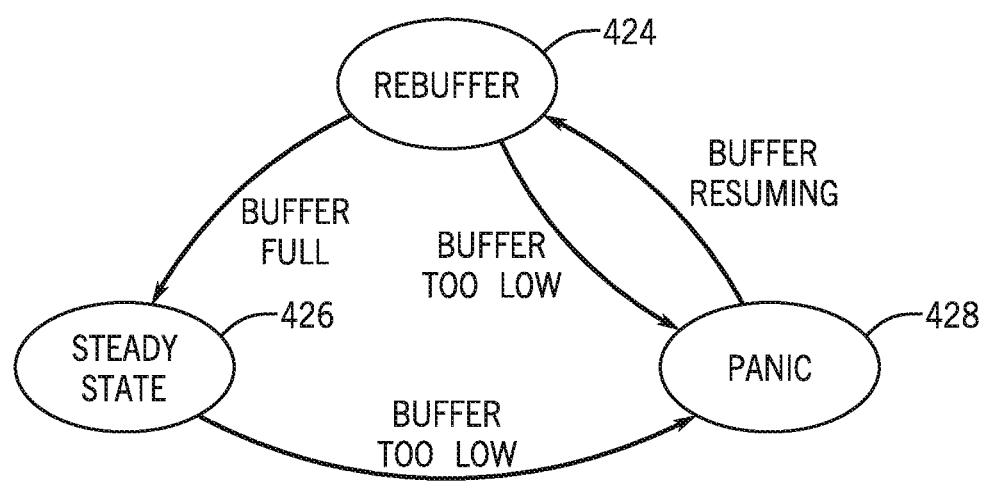
FIG. 6B illustrates another example of a quality module transitioning between different states.

With reference to FIGS. 6A and 6B, examples of the quality module 204 and its operation will now be discussed. FIG. 6A illustrates a method 400 of changing states for the quality module 204, where the different states may be associated with different quality selections, e.g., low quality, medium quality, high quality, which are used by the content player 212 to request a particular fragment to download from the server 106. The method 400 may begin with operation 402 and the client device 102 begins to receive a download, such as a fragment 104a, 104b, 104c, which may begin with the start of a content item, i.e., the first fragment for a content file. As the download starts, the method 400 proceeds to operation 404 and the quality module 204 enters the rebuffer state. The rebuffer or medium quality state, may be selected to assist the content player 212 in building up the stored fragments in the buffer and as such may correspond to lower quality fragments or an initial fragment quality than is warranted by the bandwidth and that may be less than a steady state.

As downloads continue, the method 400 proceeds to operation 406 and the processing element determines whether the buffer is sufficiently full to move to the next quality state, e.g., steady state. For example, the buffer may have predetermined thresholds for both minimum and maximum values after selected time intervals, where the minimum threshold will correspond to a change to a lower state (e.g., panic mode) and the maximum threshold corresponds to a change to a higher state (e.g., steady state). In these instances, the processing element compares the current buffer levels to the threshold values to determine whether the buffer is at a sufficient level.

In operation 406 if the buffer level is determined to have reached a sufficient level, the method 400 proceeds to operation 408 and the quality module 204 enters the next state, such as a steady or normal state. As the quality module 204 enters the steady state, the corresponding output of quality level by the quality module 204, such as to the content player 212 via the managing module 202, increases from the rebuffer state. For example, the rebuffer state may correspond to a first value of quality and the steady state may corresponding to a second value of quality that is higher resolution than the first value. The quality values may be a range or an indicator of anything higher than a particular quality value.

After operation 410, the method 400 proceeds to operation 412 and a fragment download is received, requested at the steady state quality level. As the fragment is being downloaded and after the fragment has downloaded, the method 400 proceeds to operation 414 and the processing element analyzes the current buffer state to determine whether the buffer state is too low. If the butter is sufficiently high, the method 400 returns to operation 412 and fragments at the steady state quality are continued to be downloaded. If, however, during operation 414, the processing element determines that the buffer is too low, the method 400 returns to operation 404 and the quality module 204 reenters the rebuffer state, reducing the output quality selection.

With continued reference to FIG. 6A, if in operation 406, while the quality module 204 is in the rebuffer state, and the buffer has not been sufficiently built up or is otherwise below a selected threshold, the method 400 proceeds to operation 416. In operation 416, the quality module 204 changes to the lowest quality state, e.g., a panic mode. In the lowest quality or panic state, the method 400 proceeds to operation 418 and the quality output level by the quality module 204 is reduced to the lowest level, e.g., lowest resolution fragments. It should be noted that in other embodiments, the panic mode may correspond to a variable quality. As one example, the panic mode may use the bandwidth estimate to determine a highest value of quality that is likely to successfully download given the bandwidth, or a sliding scale of quality (e.g., variable percentage of bandwidth) that starts off low, such as 20% of available bandwidth and moves higher as more fragments are downloaded successfully.

After the quality output from the quality module 204 has been reduced, the method 400 proceeds to operation 420 and the content player 212 begins to receive downloads at the lowest quality level. As the downloads are being received, the method 400 proceeds to operation 422 and the processing element analyzes the buffer values to determine whether they are sufficient to transition the quality module 204 from the panic state or lowest state to the rebuffer or medium state. If the buffer remains low, the method 400 may return to operation 420 and the content player 212 may continue to receive download at the lowest state. However, if the buffer has built back up to an acceptable level, the method 400 returns to operation 404 and the rebuffer state is entered, increasing the quality output from the quality module 204.

FIG. 6B illustrates another example of the quality module 204 and the transition between the various states, in this example, three states. As shown in FIG. 6B, the quality module 204 may begin in a first or initial state 424 (shown as rebuffer). This first or initial state corresponds to a first value of quality selection output from the quality module 204. It should be understood, that in some instances, the initial state may have a sliding scale, gradient, or other variable quality value output by the quality module 204 during this state. For example, the quality level may depend on the bandwidth available to the client device 102 as determined by the bandwidth estimator module 206 and the amount of content in the buffer. In this example, the processing element may reference a graph, lookup table, or other relationship, such as a linear gradient, by comparing the bandwidth and buffer value to determine output a quality level corresponding to the initial state for both values. This sliding scale of quality helps smooth the transition from the first or initial mode to the other modes, as the quality will increase or decrease, as the quality module 204 is likely changing states. This helps to make the increase or decrease in resolution less apparent to the user.

The initial state 424 may also correspond to an initial timeout thresholds, that determines the threshold values for the module 200 timing out downloads and retrying. It should be noted that the timeout thresholds may be tracked in milliseconds and/or seconds.

With reference to FIG. 6B, as the buffer reaches capacity, which may be a set time value of content (e.g., 3-10 seconds), the quality module 204 transitions to the second or normal state (shown as steady state) 426. In this state, the quality module 204 outputs a medium quality value or range of values to the content player 212 for next fragments to download. The normal state corresponds to the highest quality that the bandwidth will sustain. In some instances, the normal state may correspond to specific values, or may correspond to a similar sliding scale or gradient as discussed above with respect to the initial state. For example, the quality selection may be a percentage of the available bandwidth to the client device 102 for content downloads, e.g., 80 to 90 percent of the available bandwidth. In some embodiments, 90 percent is selected in order to maximize the quality of the content, but with some room (e.g., 10%) that accommodates changes in the bandwidth without dramatically impacting the downloads. In other words, the quality module 204 may select quality levels that aim to use substantially all of the client device available bandwidth for the fragment downloads.

The normal state may also correspond to normal state timeout transitions that determine the threshold values for timing out fragment downloads. The normal timeout values may be longer than the initial timeout thresholds, e.g., 2-6 seconds for timeout values for the normal state.

With reference again to FIG. 6B, if the buffer continues to fill as desired, the quality module 204 may remain in the normal state. If however, the buffer beings to drop below a selected threshold, e.g., a minimum threshold, the quality module 204 transitions to a low state. The quality module 204 may also transition to the low state from the initial state, as the buffer is reduced to its minimum threshold. In the low mode (shown as panic mode) 428, the quality module 204 outputs a quality selection level that is the lowest resolution or value for the content player 212. Additionally, the state corresponds to low transitions, which are much shorter in duration from the normal and initializing state timeouts, e.g., 1 to 2 second timeout values. The quality level and short timeout durations are selected in order to quickly rebuild the buffer, allowing the content player 212 to continue to play content, without drops in the content, albeit at a low quality.

It should be noted that the timeout values output by the quality module 204 may correspond to both the time it takes for a particular fragment to download and/or the time it takes to receive a first response from the sever 106 and/or time it takes to receive the first byte of data from the server 106. Other timeouts may be used as well, such as a timeout for downloading a percentage (e.g., 30 to 50% and preferably 50%) of the expected size of the fragment. Another timeout example is if the fragment HTTP request reports the content-length HTTP header, the timeout can be based on the length reported.

As one illustrative example, the quality module may correspond to the following values:
Rebuffer State—Timeout for first byte at 1000 milliseconds, timeload for load at 4,000 milliseconds, minimum playback buffer fullness to exit to steady state 10 seconds, maximum playback buffer fullness to exit to panic mode at 1 second, customer bandwidth percentage usage when playback buffer is empty is 50% and customer bandwidth percentage usage when playback buffer is full is 80%.

Steady State—Timeout for first byte at 2,000 milliseconds, timeout for load at 6,000 milliseconds, maximum playback buffer fullness to exit panic mode state is 4 seconds, and customer bandwidth usage is 90%.

Panic Mode or Panic State—timeout for first byte at 1,000 seconds, timeout for load at 2,000 seconds, minimum playback buffer fullness to enter rebuffer state is 4 seconds, and the lowest quality level.

Using the quality module 204, the adaptive module 200 is able to adjust download request and cancel current requests based on the buffer size and bandwidth levels. This allows the adaptive module 200 to make quicker decisions than conventional ABR players.

The adaptive quality module 200 of the present disclosure may be integrated into the content player 212 in a variety of manners. For example, the adaptive module 200 may be integrated as a plugin where the true function of the module 200 is configured so that the player views the content cancellations and timeouts as a server side issue, rather than being done locally. This example reduces the coding and other integration that may be required for content players. In this example, the adaptive module 200 may control quality level selections and HTTP network handling for requests and fragments. In another example, the adaptive module 200 may be implemented in a reverse proxy on the client device. In this example, the content player 212 is instructed to request manifests and fragments through a "local" server hosted on the client device 102. Requests from the local server for manifests are forwarded to the actual server 106, whereas request for fragments are intercepted and handled by the module 200. As the module 200 controls fragment requests, the module 200 selects the quality for the fragments and controls the HTTP request for the fragment to the actual server 106 to allow tracking of the bandwidth. In this example, the manifest may be modified so that the asset has a single ABR adaptation or quality level.

CONCLUSION

The methods and systems are described herein with reference to live streamed content. However, these techniques are equally applicable to other types of data downloads across a network. Additionally, although the discussions presented herein are discussed with respect to HTTP request, in some instances, the server requests may be done in a different manner and on varying platforms. As such, the discussion of any particular embodiment is meant as illustrative only. Further, features and modules from various embodiments may be substituted freely between other embodiments.

It should be noted that any feature, component, or operation described with respect to one embodiment or example may be used with any other embodiment or example.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A method for displaying content on a user device comprising:
   receiving by a media player a content request corresponding to a fragment download from a server;
   receiving from a quality module in communication with the media player, a quality selection for the fragment;
   downloading by the media player the fragment from the server;
   analyzing a bandwidth availability for the media player during download of the fragment, wherein analyzing the bandwidth availability comprises:
      generating a first estimate reflective of a local network condition of a local network for the user device based on a size of the fragment relative to a download time of the received fragment to the user device from the server;
      generating a second estimate reflective of a server network condition and the local network condition based on a number of bytes for the fragment received over an interval; and
      selecting the first estimate, the second estimate, or a combination of the first estimate and the second estimate to determine bandwidth availability; and
   based in part on the bandwidth availability stopping or continuing to download the fragment.

2. The method of claim 1, further comprising analyzing a buffer level during download of the fragment, wherein stopping or continuing to download the fragment is based in part on the buffer level and the bandwidth availability.

3. The method of claim 2, wherein the quality module utilizes the buffer level and the bandwidth availability to provide an updated quality selection.

4. The method of claim 1, wherein after stopping the download of the fragment, the method further comprises:
   receiving a lower quality selection for the fragment; and
   downloading by the media player, the fragment at the lower quality.

5. The method of claim 1, wherein the server is a content delivery network server.

6. The method of claim 1, analyzing the bandwidth availability comprises:
   determining a first bandwidth estimate;
   determining a second bandwidth estimate, wherein the first bandwidth estimate and the second bandwidth estimate are different from one another; and
   analyzing the first bandwidth estimate and the second bandwidth estimate together to output the bandwidth availability.

7. The method of claim 1, wherein analyzing the bandwidth available is based on a local network condition of a local network in communication with the user device.

8. The method of claim 1, wherein selecting the first estimate, the second estimate, or a combination of the first estimate and the second estimate comprises:
   determining whether the first estimate is accurate;
   determining whether the second estimate is accurate;
   when the first estimate is accurate and the second estimate is not accurate, selecting the first estimate for the bandwidth availability;
   when the first estimate is not accurate and the second estimate is accurate, selecting the second estimate for the bandwidth availability; and
   when the first estimate and the second estimate are both accurate, statistically combining the estimate and the second estimate to determine the bandwidth availability.

9. The method of claim 1, wherein the first estimate and the second estimate are determined at different points of time.

10. A method for estimating bandwidth for content downloads to a user device comprising:
   receiving a first fragment download from a server;
   determining a network bandwidth type estimate by determining a byte number of the first fragment received over a first predetermined interval of time to determine a first bandwidth estimate;
   determining another network bandwidth type estimate by determining a byte number of the first fragment received over a second predetermined interval of time to determine a second bandwidth estimate;
   determining a local bandwidth type estimate by dividing a byte size of the first fragment download by a download time for the first fragment download to output a third bandwidth estimate;
   selectively combining the first bandwidth estimate, the second bandwidth estimate, and the third bandwidth estimate to output a bandwidth value; and
   utilizing the bandwidth value to select a quality level for a second fragment to download from the server.

11. The method of claim 10, wherein the third bandwidth estimate is disregarded when the first fragment is smaller than a size threshold.

12. The method of claim 10, wherein the third bandwidth estimate is disregarded when the first fragment did not complete download during the predetermined interval of time.

13. A non-tangible computer readable medium that includes instructions that when executed by a processor cause the processor to:
   receive a first fragment download from a server;
   determine a network bandwidth type estimate by a determining a byte number of the first fragment received over a first predetermined interval of time to determine a first bandwidth estimate;
   determine another network bandwidth estimate type estimate by determining a byte number of the first fragment received over a second predetermined interval of time to determine a second bandwidth estimate;
   determine a local bandwidth type estimate by dividing a byte size of the first fragment download by a download time for the first fragment download to output a third bandwidth estimate;
   selectively combine the first bandwidth estimate, the second bandwidth estimate, and the third bandwidth estimate to output a bandwidth value; and
   utilize the bandwidth value to select a quality type for a second fragment to download from the server.

\* \* \* \* \*